United States Patent [19]
Seith et al.

[11] 3,848,359
[45] Nov. 19, 1974

[54] DEVICES, SYSTEMS AND METHODS EMPLOYING KNITTING FABRIC MULCH

[75] Inventors: Robert T. Seith, Tuscaloosa, Ala.; Otto M. Bundy, Bradenton, Fla.

[73] Assignee: Gulf States Paper Corporation, Tuscaloosa, Okla.

[22] Filed: Feb. 20, 1973

[21] Appl. No.: 333,782

[52] U.S. Cl.............................. 47/56, 47/9, 239/145
[51] Int. Cl.......................... A01g 25/02, A01c 1/04
[58] Field of Search .................... 47/56, 9, 25, 48.5; 239/266, 273, 145

[56] References Cited
UNITED STATES PATENTS

| | | | |
|---|---|---|---|
| 2,196,917 | 4/1940 | Hartley ........................... | 47/56 UX |
| 2,566,833 | 9/1951 | Healy ............................. | 239/266 X |
| 2,940,219 | 6/1960 | Schiller .......................... | 47/9 X |
| 3,080,681 | 3/1963 | Merrill et al. ................... | 47/56 |
| 3,181,273 | 5/1965 | West et al. ...................... | 47/9 X |
| 3,205,619 | 9/1965 | Henry ............................. | 47/9 |
| 3,315,408 | 4/1967 | Fisher ............................ | 47/9 |
| 3,704,544 | 12/1972 | Spanel et al. .................... | 47/9 |
| 3,757,469 | 9/1973 | Smith et al. ..................... | 47/48.5 |

FOREIGN PATENTS OR APPLICATIONS

| | | |
|---|---|---|
| 700,077 | 11/1940 | Germany |
| 45-27764 | 9/1970 | Japan |

*Primary Examiner*—Robert E. Bagwill
*Attorney, Agent, or Firm*—Raphael Semmes

[57] ABSTRACT

Knitted fabric mulches are disclosed for use in erosion control, landscaping, irrigation, and growing systems for agricultural-horticultural purposes. The fabrics incorporate insert strips of paper, metal, plastic, or other material and employ different types of yarn, depending upon the intended purpose. Irrigation tubes and/or seed tapes are incorporated in certain fabrics employed for agricultural-horticultural purposes.

13 Claims, 7 Drawing Figures

3,848,359

DEVICES, SYSTEMS AND METHODS EMPLOYING KNITTING FABRIC MULCH

BACKGROUND OF THE INVENTION

This invention is concerned with the provision and utilization of knitted fabric mulches, the term "mulch" as used herein meaning a protective covering spread or left upon the ground to reduce evaporation, maintain even soil temperature, prevent erosion, control weeds, enrich the soil, or to provide an irrigation and/or growing system, as will be later described.

Woven jute and synthetic nettings have been used for the control of erosion for several years. The open nettings are too weak to provide sufficient soil stabilization, are difficult to handle, and have a tendency to tear during laying. The closed nettings are expensive, and, being non-degradable, tend to be lifted by grass growing under the netting, allowing wind to lift the netting from the ground. Eventually the netting must be removed by hand and effective control of erosion ceases.

Existing nettings have been employed or suggested for use in applications such as highway construction and maintenance, landscaping, and strip mine recovery. With the possible exception of certain landscaping applications, all such uses require a system needing little maintenance once the area covered by the netting is planted. It would be highly desirable to have a product which would both degrade enough to allow full development of vegetation and yet provide permanent erosion control. These characteristics are particularly important in the replanting of strip mine areas. None of the products presently available provides a completely satisfactory solution, especially for mining applications.

U.S. Pat. No. 3,315,408 to Fisher is an example of a prior art woven fabric intended for the control of soil erosion. Although the patent suggests the utilization of different types of yarns, including biodegradable yarns and tubular or hollow core yarns containing agents or materials to be released (such as fertilizers, pesticides and weed killers), the woven fibrous material taught by this patent suffers from the deficiencies of woven materials, including limited flexibility and limitations upon the yarns which may be woven. Moreover, the fabrics taught do not possess sufficient versatility to provide a complete agricultural-horticultural system.

Other types of mulches or ground covers employing sheets of material, as contrasted with nettings, are disclosed, for example, in U.S. Pat. No. 3,205,619 to Henry, U.S. Pat. No. 3,302,323 to Popa, U.S. Pat. No. 3,467,142 to Boyle et al, U.S. Pat. No. 3,511,694 to Lippoldt et al, U.S. Pat. No. 3,427,194 to Lippoldt et al, and U.S. Pat. No. 3,516,196 to Lippoldt et al. The Henry, Popa, and Boyle et al patents teach the utilization of such sheets for irrigating or fluid distribution. It has also been proposed to provide ground cover sheets with seeds, fungicides, fertilizers, insecticides, herbicides, and growth hormones, for example, to facilitate the planting and growth of grass or other plants. See, for example, U.S. Pat. No. 3,557,491 to Franklin et al and U.S. Pat. No. 3,160,986 to Watson et al. However, it has not been possible heretofore to provide such elements and structures in a satisfactory open-mesh mulch, in particular a mulch having sufficient versatility and other basic characteristics to provide a complete agricultural-horticultural system.

BRIEF DESCRIPTION OF THE INVENTION

It is accordingly a principal object of the present invention to provide improved devices, systems, and methods which avoid or overcome the aforesaid and other disadvantages of the prior art.

A further object of th invention is to provide improved devices, systems, and methods for erosion control, landscaping, and agricultural-horticultural purposes.

Briefly stated, the present invention is based upon the provision and utilization of open-mesh knitted fabrics which may incorporate a variety of inserts, including, for example, insert strips of paper, metal, plastic or other materials, seed tapes, and irrigation tubes.

BRIEF DESCRIPTION OF THE DRAWINGS

The invention will be further described in conjunction with the accompanying drawings, which illustrate preferred and exemplary embodiments, and wherein.

DESCRIPTION OF THE PREFERRED EMBODIMENTS

Figure 1:
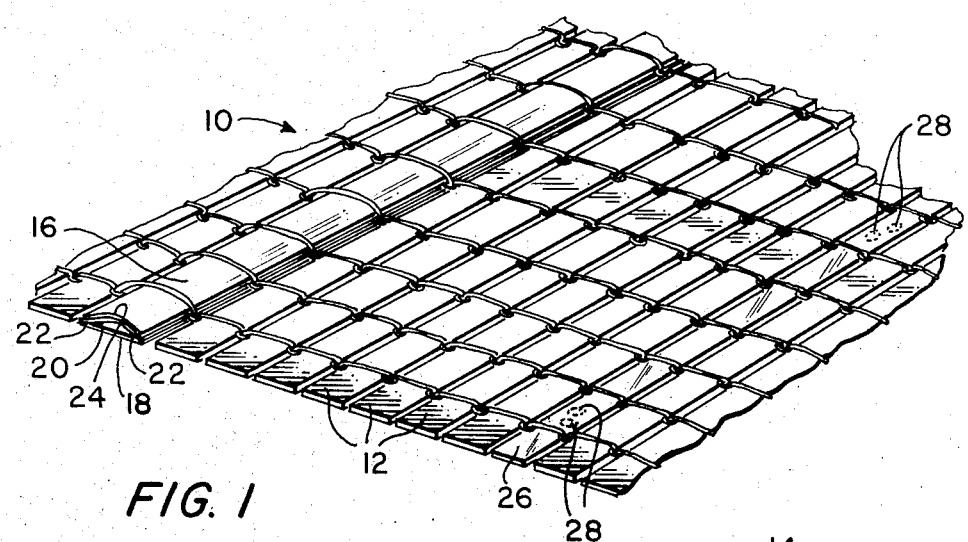
FIG. 1 is a fragmentary perspective view of an embodiment of the invention incorporating an irrigation tube and a seed tape.

Referring to the drawings, and initially to FIG. 1 thereof, the present invention employs an open-mesh knitted fabric, generally designated by reference numeral 10, which may incorporate a plurality of inserts, such as the strips 12. The basic fabric incorporating inserts may be manufactured by the so-called VEEV technique, as described, for example, in U.S. Pat. No. 3,507,130 to Marks et al. As is well known, the knitted fabric may be considered as comprising longitudinally connected loops defining wales and transversely connected loops defining courses. Different types of knitting stitches, such as the jersey stitch or the full tuck stitch, may be employed. In at least one direction, such as the direction of the courses, the fabric has considerable stretchability, as contrasted with the non-stretchability of woven fabrics. In the fabrics employed in this invention, a wide variety of knitting yarns may be used, depending upon the physical properties and durability required for the end use application. The yarn fibers, which may be used in deniers ranging from 50 to 850, for example, may include one or more of the following materials:

Acetate — Fiber in which the fiber-forming substance is cellulose acetate.

Acrylic — Fiber-forming substance is any long-chain synthetic polymer composed of at least 85% by weight of acrylonitrile units.

Anidex — A manufactured fiber in which the fiber-forming substance is any long chain synthetic polymer composed of at least 50% by weight of one or more esters of a monohydric alcohol and acrylic acid.

Glass — Fiber in which the fiber-forming substance is glass.

Cotton, linen, jute and other natural fibers

Metal — Fiber in which the fiber-forming substance is stainless steel.

Modacrylic — Fiber in which the fiber-forming substance is any long chain synthetic polymer composed of less than 85% but at least 35% by weight of acrylonitrile units.

Nylon 6 — Fiber-forming substance is any long chain synthetic polyamide having recurring amide groups as an integral part of the polymer chain (there are 6 carbons per molecule, hence the designation Nylon 6).

Nylon 66 — Same as Nylon 6 except it is the polyamide from two different compounds each containing 6 carbons per molecule.

Olefin — Fiber in which the fiber-forming substance is any long chain synthetic polymer composed of at least 85% by weight of ethylene, propylene, or other olefin units.

Polyester — Fiber in which the fiber-forming substance is any long chain snythetic polymer composed of at least 85% by weight of an ester of a dihydric alcohol terephthalic acid.

Rayon — Fiber composed of regenerated cellulose as well as fibers composed of regenerated cellulose in which substituents have replaced not more than 15% of the hydrogens of the hydroxyl groups.

Saran — Fiber-forming substance is any long chain synthetic polymer composed of at least 80% by weight of vinylidene chloride units.

Spandex — Fiber in which the fiber-forming substance is a long chain synthetic polymer comprised of at least 85% of a segmented polyurethane.

Triacetate — Fiber in which fiber-forming substance is cellulose acetate. Where not less than 92% of the hydroxyl groups are acetylated, the term triacetate may be used as a generic description.

Figure 1A:
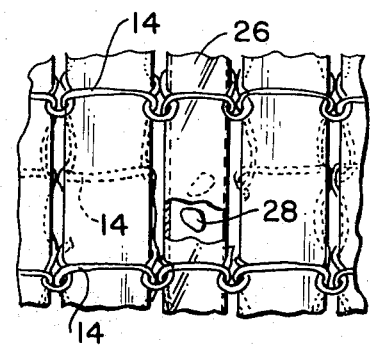
FIG. 1A is an enlarged fragmentary plan view illustrating details of the embodiment of FIG. 1.

The inserts 12, which in general may be of much greater width than the knitted yarns, extend along parallel paths, preferably between and parallel to the wales and perpendicular to the courses. The inserts are interleaved with elements of the knitted fabric, such as the cross-links or sinker loops 14. See. FIG. 1A. For some applications of the invention, the inserts may not be interleaved with every course (some courses may be skipped), and inserts need not be placed between every pair of wales (some pairs of wales may be skipped to provide open spaces). The inserts may be formed of materials such as paper, metal foil, or plastic, or combinations of the same, depending upon the end application of the invention. Paper inserts may have selected degrees of biological degradation, the following being a list of suitable papers, which are listed in order of increasing rate of resistance to biological degradation:

1. Unsized, unhydrated, kraft composed of at least 80 percent hardwood fiber
2. Southern bag papers standard grades
3. Recycled waste paper
4. Paper treated with mold-inhibiting chemicals
5. Paper same as (4) but coated on one or two sides with a barrier coating.

In most instances, the insert strips will be opaque, and in some instances, (as where it is desired to reflect heat), the insert strips will be light-reflecting. The strips cover a major portion of the area of the fabric.

In accordance with the invention, other types of inserts may also be incorporated in the fabric, all at the point of manufacture. Thus, as shown in FIG. 1, one or more irrigation tubes 16 may extend along paths parallel to the insert strips 12 and be interlaced with elements of the fabric, such as the cross links 14. The irrigation tubes are preferably formed of co-extensive juxtaposed strips 18 and 20 which are sealed to each other along their longitudinal edges 22, the tube being normally collapsed to a flat state which permits it to be readily inserted into the fabric and to be rolled up with the fabric for storage. Typically, the irrigation tube may be formed of "Tyvek" spunbonded olefin, which is a sheet structure composed of very fine plexifilaments of linear polyethylene. This is a porous material having a pore size of 5 or 6 microns, for example, a Gurley air porosity (sec/100M 1/2 psi) of 13, and an MVTR (g/24 hrs/M$^2$) of between 800 and 1,000. The porous strip material, which may be 7/8 inch wide, for example, may be heat sealed at the longitudinal edges to form a tube which is 1/2 inch diameter when expanded by internal pressure. The irrigation tube may be covered by an opaque (black) polyethylene and paper laminated strip or an aluminum foil and paper laminated strip 24 which serves as a water-impervious and/or heat-reflective protective covering overlying the tube.

Figure 3:
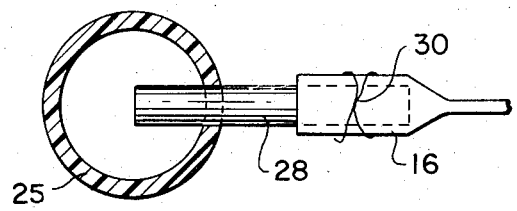
FIG. 3 is a fragmentary sectional view illustrating the manner in which liquid is supplied to an irrigation tube incorporated in the invention.

FIG. 3 illustrates the manner in which the irrigation tubes may be supplied with liquid from a header pipe 25 connected to a liquid supply (not shown). An adapter tube 28 fixed to and extending transversely from the header pipe 25 fits within the opened end of the irrigation tube 16, which is secured thereto by a wire or plastic tie 30. The header may be part of a liquid distribution system, which may include a water pump, filters, meters, valves, chemical supply tanks, and chemical pumps, all of which cooperate to supply liquids to the irrigation tubes at the desired rate and concentration.

A further type of insert which may be incorporated in the knitted fabric is a seed tape 26. The seed tape may be composed of a pair of strips of water soluble material, such a polyvinyl alcohol material, sealed along their edges and having seeds secured therebetween at spaced locations, as shown at 28 in FIGS. 1 and 1A. Alternatively, the seed tapes may be formed of biodegradable paper strips to which the seeds are attached by means of a suitable water-soluble or biodegradable adhesive. As will appear hereinafter, the insert strips 12 may themselves be seed tapes. The seed tapes may incorporate plant hormones, nutrients, biological additives, fertilizers, pesticides, fungicides, etc. which may be placed within or upon the tapes as spots where the seeds are located or distributed generally in the tapes.

Figure 2:
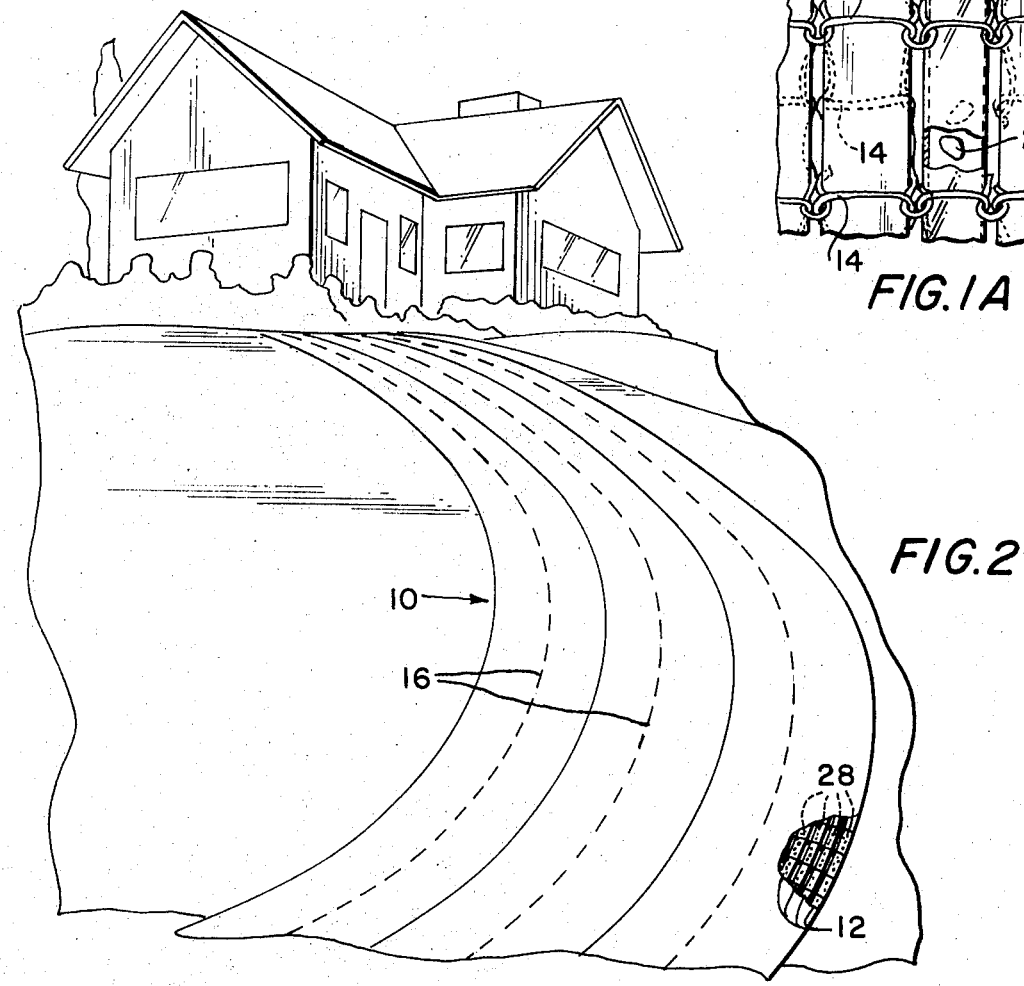
FIG. 2 is a diagrammatic perspective view, partially broken away, illustrating the utilization of a mulch of the invention in a growing system for grass, for example.

FIG. 2 illustrates the utilization of a mulch of the invention in a landscaping application. The knitted fabric 10 incorporates a series of irrigation tubes 16, and the insert strips 12, which may be of unsized kraft paper to promote rapid biological deterioration, may have grass seed 28 randomly attached to the lower side thereof, as by a nutrient (dextrine) glue which increases the rate of deterioration. The mulch, which may be supplied in rolls of any convenient width and length, is spread over the area of the ground to be treated and is secured thereto by staples and by anchoring edges of the mulch material in shallow slots or trenches. The irrigation tubes are connected to a liquid supply header (not shown in FIG. 2). As water is applied to the system, the paper deteriorates allowing germination of the seeds. The mesh, which may be formed of non-degradable knitting yarns, remains in place after germination and sinks into the plant root structure to provide permanent erosion resistance. By using specially treated or coated papers, the rate of deterioration can be controlled over a span of several years, if desirable.

Figure 4:
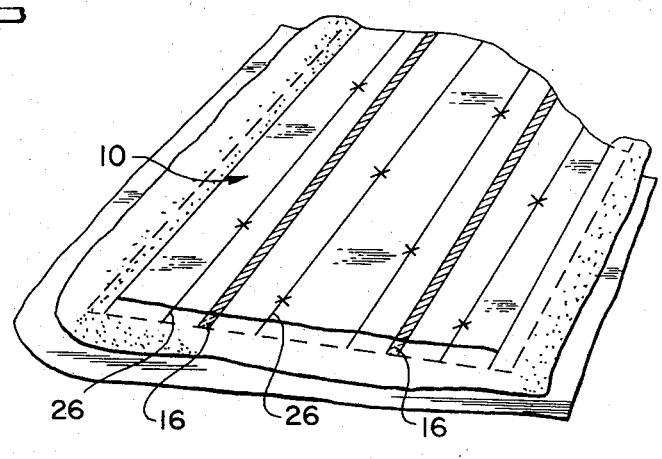
FIGS. 4, 5 and 6 are fragmentary diagrammatic perspective views illustrating the utilization of different types of mulches in accordance with the invention.
Figure 5:
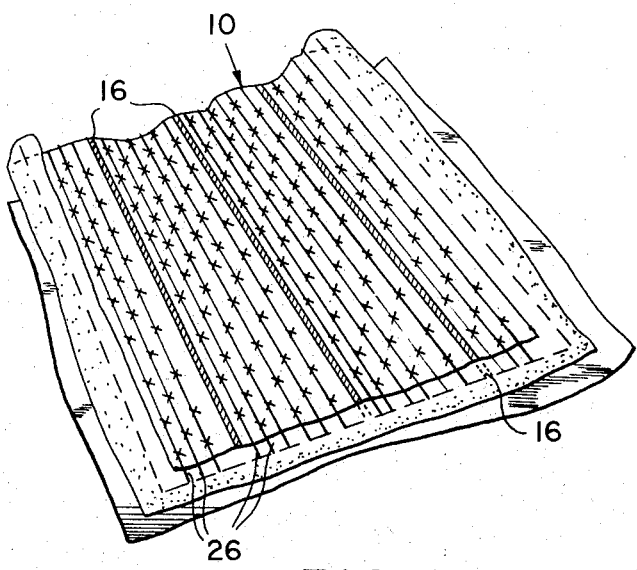
Figure 6:
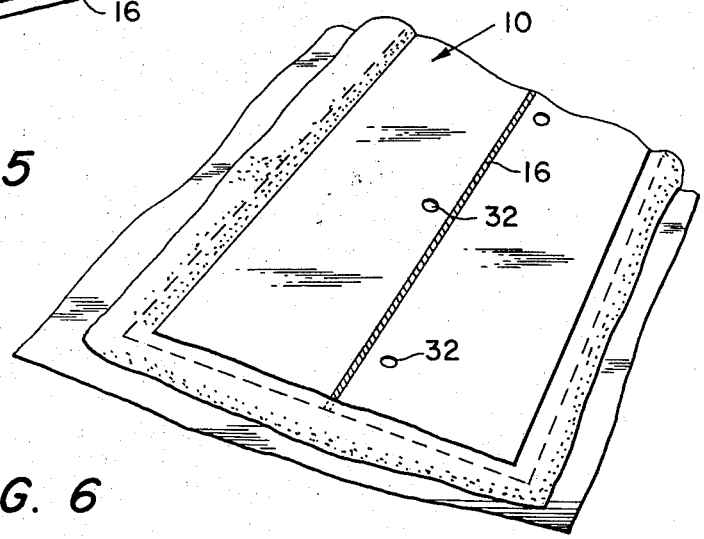

FIG. 4 illustrates a type of mulch in accordance with the invention which may provide a growing system for lettuce or cabbage, for example. The mulch material has a total width of 60 inches, for example, with 3 inches at each longitudinal edge placed under soil for anchoring purposes. The mulch incorporates a pair of irrigation tubes 16, which may be 27 inches apart and equally spaced from the longitudinal edges, and four seed tapes 26, which may be 13½ inches apart with the outermost seed tapes spaced equally from the longitudinal edges. The seeds may be 3 inches apart on the tapes but the plants may later be thinned to 12 inch spacing. In FIG. 5 a mulch of similar overall dimensions is shown incorporating three irrigation tubes 16 and 18 seed tapes 26 having seeds spaced apart of the order of 2 inches. Such a mulch is suitable for the growing of carrots, for example. In FIG. 6 a mulch having the same overall dimensions is shown, but incorporating a single irrigation tube 16 along the longitudinal center line and having holes 32 through the fabric for the planting of tomato or squash plants, for example. The holes may be 2 inches in diameter, spaced 24 inches apart longitudinally and staggered back and forth with respect to the irrigation tube 16.

From the foregoing it is apparent that an agricultural-horticultural growing system of the invention comprises a knitted fabric of yarns or yarn-like elements and a plurality of inserts interengaged or interlaced with such elements. The insert strips include strips of paper, for example, which may have a broad selection of properties depending upon the end use application, irrigation tubing, water soluble or degradable seed tapes, and various cover strips, which may be plastic or metal material, for example, to protect various insert elements, and also to control temperature or even to measure pH or other physical/chemical characteristics. As a whole the purpose of this system is to modify, in the most desirable manner, the soil/air environment wherein a plant or grass grows or develops and provide a mechanism either for anchoring grass in place or harvesting a commercial crop. The system may be used for (1) landscaping — including lawn or grass development, highway erosion control and planting, and the growing of ornamental crops, (2) mining — including strip mine recovery (growing stabilizing erosion control elements in hostile environments), modification of soil chemical properties, and recovery of land subjected to chemical defoliation, and (3) food production — including the growing of vegetables or grains, for example.

In the production of food crops, for example, by utilization of the invention, the selective placement of seed tapes and irrigation tubing in the knitted fabric, the inclusion of treated mulch paper in the remaining warp areas, and the selection of a proper knitting yarn provide a total system capable of unique control over the growing and harvesting process results. The advantages of the growing system of the invention over conventional methods include higher marketable yield, higher quality crops, substantial reduction in water requirements (due to trickle irrigation at the points where the water is best utilized by the plants and due to reduced evaporation), reduction of salt accummulation in the soil, reduction of the need for fertilizers and chemicals, reduction of root damage due to cultivation, the provision of precise plant spacing and increased uniformity of growing environment, the production of earlier yields, and the provision of resistance to wind and water erosion. The inclusion of seed tapes and irrigation tubing in a knitted open-mesh mulch which prevents erosion and reduces water evaporation produces a synergistic effect, increasing crop yields while reducing water requirements.

The advantages of the invention are also clearly evident in the application to strip mine reclamation. One of the most difficult areas to replant is a mine where high sulfur content coal has been stripped from the surface. Residual sulfuric acid creates a most hostile soil environment. By using encapsulated seeds on tapes and a buffered or alkaline water through the irrigation tubes, these soil acids can be neutralized, resulting in immediate plant growth and high survival rates.

The utilization of knitted fabrics provides greater flexibility and conformity to the surface of the ground than has heretofore been possible. Yarns may be used which are not capable of being woven, with consequent savings in cost and increase in versatility. Paper insert characteristics may be varied to meet a variety of end use requirements, so that the system may be tailored to the particular application. For example, where the application is rapid lawn development with minor erosion control thereafter, a biodegradable mesh knitted fabric may be employed together with a paper that will degrade rapidly. For a ditch liner, however, where permanent protection is required, a non-degradable yarn and a permanent paper, such as a polyethylene coated paper may be used.

Typical mulches in accordance with the invention may incorporate knitting yarns and paper insert strips in the following combinations, which are merely for the purpose of example:

40 pound kraft paper
840/600 polypropylene yarn (typical fabric weight per square yard:
3 ounces, comprising 1.529 ounces of paper and 1.472 ounces of yarn)
Gulf States Paper Corp. spec. 42/4020 green bag paper
420 denier polypropylene yarn
Gulf States Paper Corp. standard 42 pound bag paper 840 denier polypropylene yarn
Gulf States Paper Corp. sized 30 pound asphalting kraft paper
420 denier polypropylene yarn
Gulf States Paper Corp. polyethylene coated mulch paper
840 and 420 denier polypropylene yarn
55 pound uncoated mulch paper
840 denier polypropylene yarn
55 pound mold-proof paper coated with 1/2 mil medium density polyethylene on each side 1050 polypropylene yarn.

While preferred embodiments of the invention have been shown and described, it will be apparent to those skilled in the art that changes can be made in these embodiments without departing from the principles and spirit of the invention, the scope of which is defined in the appended claims.

The invention claimed is:

1. A mulch comprising an open-mesh knitted fabric constituted by a multiplicity of knittedly interconnected longitudinal and transverse yarn elements, said fabric having at least one seed tape and a multiplicity of parallel strips between longitudinal yarn elements and interleaved with transverse yarn elements of said fabric, said strips being substantially wider than said yarn elements and occupying a major portion of the area of the fabric.

2. A mulch in accordance with claim 1, wherein said fabric has at least one irrigation tube between longitudinal yarn elements and interleaved with transverse yarn elements of said fabric.

3. A mulch in accordance with claim 2, wherein said irrigation tube comprises a pair of co-extensive strips sealed together along longitudinal edges thereof and normally juxtaposed, so that the tube is collapsed until pressurized internally, at least one of the last-mentioned strips being porous.

4. A mulch in accordance with claim 1, wherein said seed tape comprises a strip with seeds releasably attached thereto by a soluble or degradable bond.

5. A mulch in accordance with claim 1, wherein said seed tape comprises a plant nutrient.

6. A mulch in accordance with claim 1, wherein said seed tape comprises a fertilizer.

7. A mulch in accordance with claim 1, wherein said seed tape comprises a pesticide.

8. A mulch in accordance with claim 1, wherein said seed tape comprises a fungicide.

9. A mulch in accordance with claim 1, wherein said strips comprise paper material.

10. A mulch in accordance with claim 1, wherein said strips comprise plastic material.

11. A mulch in accordance with claim 1, wherein said strips comprise foil material.

12. A method of mulching which comprises providing an open-mesh knitted fabric constituted by a multiplicity of knittedly interconnected longitudinal and transverse yarn elements, said fabric having at least one seed tape and a multiplicity of parallel strips between longitudinal yarn elements and interleaved with transverse yarn elements of said fabric, said strips being substantially wider than said yarn elements and occupying a major portion of the area of the fabric; and covering an area of ground with said fabric.

13. A method in accordance with claim 12, wherein the knitted fabric is provided with at least one irrigation tube extending between longitudinal yarn elements and interleaved with transverse yarn elements of said fabric.

* * * * *

UNITED STATES PATENT OFFICE
CERTIFICATE OF CORRECTION

Patent No. 3,848,359  Dated November 19, 1974

Inventor(s) Robert T. Seith and Otto M. Bundy

It is certified that error appears in the above-identified patent and that said Letters Patent are hereby corrected as shown below:

Front Page - In the title of the patent, change the word "KNITTING" to -- KNITTED --.

The assignee is located in Tuscaloosa, Alabama.

Column 1, in the title of the patent, change the word "KNITTING" to -- KNITTED --.

Column 2, line 8, "th" should be -- the --.

Column 4, line 46, "a" should be -- as --.

Column 6, lines 11 and 12 from the bottom should be single spaced.

Signed and sealed this 11th day of February 1975.

(SEAL)
Attest:

RUTH C. MASON
Attesting Officer

C. MARSHALL DANN
Commissioner of Patents
and Trademarks